United States Patent
Wallace et al.

(10) Patent No.: US 6,315,971 B1
(45) Date of Patent: *Nov. 13, 2001

(54) PROCESS FOR PRODUCING LOW DENSITY GEL COMPOSITIONS

(75) Inventors: Stephen Wallace; Douglas M. Smith, both of Albuquerque, NM (US); William C. Ackerman, Champaign, IL (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/826,979

(22) Filed: Apr. 9, 1997

(51) Int. Cl.$^7$ ................................................ C01B 33/158
(52) U.S. Cl. ........................................ 423/338; 516/111
(58) Field of Search ....................... 423/338; 252/315.6; 516/111

(56) References Cited

U.S. PATENT DOCUMENTS

| | | |
|---|---|---|
| 2,269,059 | 1/1942 | McLachlan et al. . |
| 2,739,075 | 3/1956 | Iler . |
| 2,765,242 * | 10/1956 | Alexander et al. .................. 423/338 |
| 2,832,794 | 4/1958 | Gordon . |
| 2,901,460 | 8/1959 | Boldebuck . |

(List continued on next page.)

FOREIGN PATENT DOCUMENTS

| | | |
|---|---|---|
| 0 372 251 | 6/1990 | (EP) . |
| 0 684 642 | 11/1995 | (EP) . |
| 0 585 456 | 7/1997 | (EP) . |
| 854 659 | 4/1940 | (FR) . |
| 2 585 973 | 2/1987 | (FR) . |
| 93/23333 | 11/1993 | (WO) . |
| 94/25149 | 11/1994 | (WO) . |
| 96/06051 | 2/1996 | (WO) . |
| 96/12683 | 5/1996 | (WO) . |
| 96/18456 | 6/1996 | (WO) . |
| 97/01508 | 1/1997 | (WO) . |
| 97/22652 | 6/1997 | (WO) . |

OTHER PUBLICATIONS

Egeberg et al., "Freeze Drying of Silica Gels Prepared from Siliciumethoxid", Revue De Physique Appliquee, pp. C4–23–C4–28 (Apr. 24, 1989).

Heley et al., "Fine Low Density Silica Powders Prepared by Supercritical Drying of Gels Derived from Silicon Tetrachloride" Journal of Non–Crystalline Solids, vol. 186, pp. 30–36 (1995).

Kasraian et al., "Thermal Analysis of the Tertiary Butyl Alcohol–Water System and Its Implications on Freeze–Drying", Pharmaceutical Research, vol. 12, No. 4, pp. 484–490 (1995).

Klvana et al., "A New Method of Preparation of Aerogel–Like Materials Using a Freeze–Drying Process", Revue De Physique Appliquee, pp. C4–29–C4–32 (Apr. 1998).

Pajonk, "Drying Methods Preserving the Textural Properties of Gels", Revue De Physique Appliquee, pp. C4–13–C4–22 (Apr. 24, 1989).

(List continued on next page.)

Primary Examiner—Stuart L. Hendrickson

(57) ABSTRACT

Disclosed are processes for producing gel composition which may be utilized to produce low density gel compositions without the need for supercritical drying, thermal treatment or surface treatment. The processes comprise drying a wet gel comprising gel solids and a drying agent to remove the drying agent while minimizing shrinkage of the gel during drying.

14 Claims, 1 Drawing Sheet

U.S. PATENT DOCUMENTS

| | | |
|---|---|---|
| 3,652,214 | 3/1972 | Aboutboul et al. . |
| 3,672,833 | 6/1972 | Teichner et al. . |
| 3,956,179 | 5/1976 | Sebestian et al. . |
| 4,150,101 | 4/1979 | Schmidt et al. . |
| 4,561,872 | 12/1985 | Luong et al. . |
| 4,667,417 | 5/1987 | Graser et al. . |
| 4,775,520 | 10/1988 | Unger et al. . |
| 4,810,415 | 3/1989 | Winkelbauer et al. . |
| 4,842,837 | 6/1989 | Takaaki et al. . |
| 4,911,903 | 3/1990 | Unger et al. . |
| 4,983,369 | 1/1991 | Barder et al. . |
| 5,017,540 | 5/1991 | Sandoval et al. . |
| 5,106,604 | 4/1992 | Agaskar . |
| 5,158,758 | 10/1992 | Chieng et al. . |
| 5,206,189 | 4/1993 | Caldwell . |
| 5,275,796 | 1/1994 | Tillotson et al. . |
| 5,326,738 | 7/1994 | Sandoval et al. . |
| 5,376,449 | 12/1994 | Harris et al. . |
| 5,391,364 | 2/1995 | Cogliati . |
| 5,395,805 | 3/1995 | Droege et al. . |
| 5,409,683 | 4/1995 | Tillotson et al. . |
| 5,420,168 | 5/1995 | Mayer et al. . |
| 5,647,962 * | 7/1997 | Jansen et al. .................. 423/338 |
| 5,746,992 * | 5/1998 | Yoldas et al. .................. 423/338 |
| 5,928,723 * | 7/1999 | Koehlert et al. ................ 427/213 |

OTHER PUBLICATIONS

Database WPI, Derwent Publications Ltd., London, GB, AN 86–098541, JP 61 044 711.

Database WPI, Derwent Publications Ltd., London, GB, AN 87–104939, JP 62 052 119.

Database WPI, Derwent Publications Ltd., London, GB, AN 87–247982, JP 62 171 914.

*Patent Abstracts of Japan*, vol. 10, No. 235(C–366), JP 61 068 314 (1986).

Shioji, S. et al., "Surface Alkoxylation of Silicas by Mild Reactions with Alcohols" *Bull. Chem. Soc. Jpn.*, 65(3), 728–734 (1992).

Ballard, C.C. et al., "Esterification of the Surface of Amorphous Silica", *Industrial and Biochemicals Department, E.I. du Pont de Nemours & Co, Inc.*, Wilmington, Delaware , 65, 20–25 (1961).

Heinrich et al., "Aerogels–Nanoporous Materials, Part I: Sol–Gel Process and Drying of Gels" *Journal of Porous Materials*, 1, 7–17 (1995).

Smith et al., "Preparation of Low–Density Xerogels at Ambient Pressure" *Journal of Non–Crystalline Solids* 186, 104–112 (1995).

* cited by examiner

PROCESS FOR PRODUCING LOW DENSITY GEL COMPOSITIONS

FIELD OF THE INVENTION

The present invention relates to a process for producing low density gel compositions, including aerogels, xerogels and the like, without the need for a supercritical drying step, thermal treatment or chemical surface treatment.

BACKGROUND

The term "gel" encompasses wet gels, including hydrogels and alcogels; and gels dried from the wet gels including aerogels and xerogels. The term "aerogel" was coined by S. S. Kistler in U.S. Pat. No. 2,188,007 and is generally utilized to refer to a gel which has been dried under supercritical temperature/pressure conditions. The term "xerogel" is generally utilized to refer to a gel which has been dried by evaporation of the solvent. Gel composition refers to a composition comprising a gel which may further include other components, for example an opacifying agent or coloring agent.

Gel compositions are utilized in a wide variety of applications, including thermal and acoustic insulation; catalyst supports and carriers; filters and molecular sieves; rheology control agents; reinforcing agents; thickeners and electronics; adsorbents; flatting agents; particulate additives; membranes; filters; radiation detectors; coatings; and dielectrics and other applications set forth herein and/or known to those of ordinary skill in the art. Gel compositions having lower rod densities, and/or higher surface areas, and/or higher structure are more advantageous for use in many applications. A gel composition's rod density is related to the gel composition's porosity wherein gel composition's with lower rod densities will generally have higher porosities.

Gel compositions are generally produced by combining a gel precursor and suitable solvent to form a sol and then initiating gelation in the sol to form a "wet" gel comprising the solid gel structure and the liquid solvent. The liquid solvent is then removed to form a dry gel composition.

Aerogels produced utilizing a supercritical drying step generally have lower rod densities than heretofore known gel compositions produced without the use of supercritical drying and have therefore become the gel of choice for many applications. However, the supercritical drying step necessary for the production of an aerogel may require the use of relatively expensive and/or complex processing equipment and conditions and therefore be disadvantageous.

In addition to approaches utilizing supercritical drying, at least several other approaches to producing gels have been proposed.

Alexander et al. U.S. Pat. No. 2,765,242 disclose a process for producing gels utilizing aging in water at high temperature followed by heat treatment in alcohols at temperatures significantly above the boiling point in order to esterify the surface. The gel granules may then be milled until a fine powder is obtained. Disadvantages of the approach disclosed in Alexander et al. include the cost of the high pressure esterification step.

WO 94/25149 discloses a process for the preparation of xerogels by chemical surface modification. The disclosed chemical surface modification agents have the formula $R_xMX_y$ where R is an organic group such as $CH_3$, $C_2H_5$ etc.; X is a halogen and M is Si or Al. Potential disadvantages of the approach disclosed in WO 94/25149 include the high cost of the reagents and potential problems relating to disposal of the by-products of the reaction.

U.S. Pat. No. 5,270,027 discloses a process for preparing silica xerogels using alkanolamines. The disclosed process produces xerogels having a total pore volume variable from 2 to 3 cc/g. The equivalent density of individual granules is 0.29 to 0.37 g/cc. Potential disadvantages of the approach disclosed in U.S. Pat. No. 5,270,027 include the complicated steps disclosed as part of the process, in particular the thermal treatment step, and that the process is not disclosed as producing aerogels with densities low enough for certain applications.

SUMMARY OF THE INVENTION

The present invention provides processes for producing gel compositions having advantageously low rod densities without the need for supercritical drying, thermal treatment or chemical surface modification.

The present invention provides processes for producing gel compositions comprising: drying a wet gel comprising gel solids and a drying agent to remove the drying agent under drying conditions sufficent to minimize shrinkage of the gel during drying.

In a first aspect, the present invention provides a process for producing gel compositions comprising: drying a wet gel comprising gel solids and a drying agent to remove the drying agent at a pressure of less than 300 pounds per square inch absolute (psia) sufficient to minimize shrinkage of the gel during drying. Preferably the rod density and/or tap density of the dried gel compositions (Rod Density) is less than or equal to 115% of the theoretical density of the gel solids in the reaction solution (Theoretical Density) as follows: (Rod Density/Theoretical Density)$\leq$115%.

In another aspect, the present invention provides a process for producing gel compositions comprising: drying a wet gel comprising gel solids and a drying agent to remove the drying agent at a pressure of less than 300 psia to produce a dried gel composition have a rod density of less than or equal to 0.27 grams/cubic centimeter (g/cc).

In a further aspect, the present invention provides a process for producing gel compositions comprising: drying a wet gel comprising gel solids and a drying agent to remove the drying agent at a pressure of less than or equal to 300 psia to produce a dried gel composition have a tap density of less than or equal to 0.2 grams/cubic centimeter (g/cc).

In a further aspect, the present invention provides a process for producing gel compositions comprising: drying a wet gel comprising gel solids and a drying agent to remove the drying agent wherein the chemical properties of the drying agent minimize shrinkage of the gel during drying.

An advantage of aspects of the present invention is that the processes may be performed at ambient temperatures and/or ambient pressures.

The features and advantages of the processes of the present invention are described in more detail in the following sections.

DETAILED DESCRIPTION OF THE INVENTION

Figure 1:
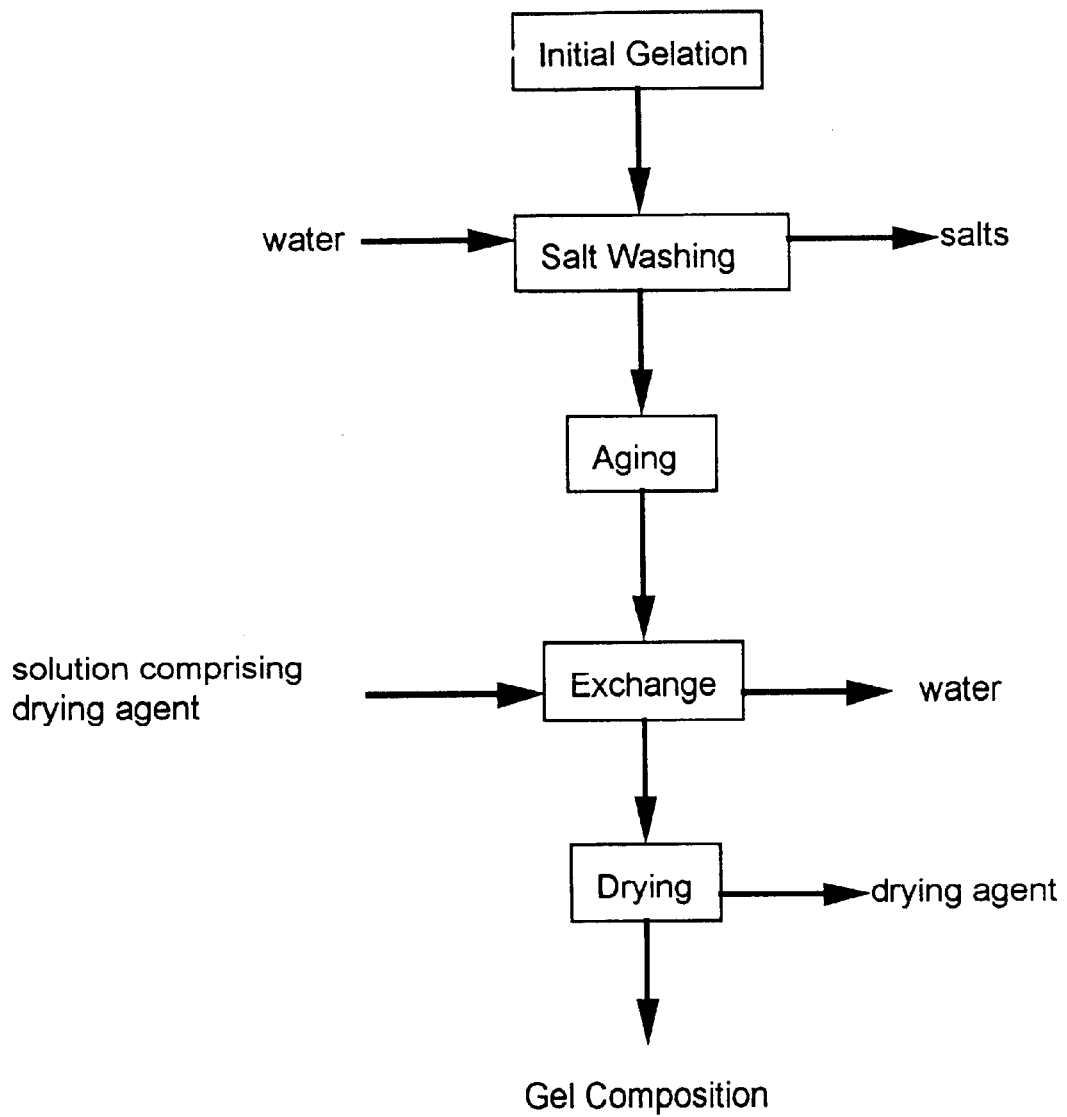
FIG. 1 is a schematic diagram of an embodiment of a process of the present invention for producing gel compositions.

The present invention provides processes for producing gel compositions comprising drying a wet gel comprising gel solids and a drying agent to remove the drying agent.

According to one aspect of the present invention, a process for producing gel compositions comprising: drying a wet gel comprising gel solids and a drying agent to remove the drying agent under drying conditions sufficient to minimize shrinkage of the gel during drying, at a pressure of less than or equal to 300 psia, preferably at a pressure of less than or equal to 100 psia, more preferably less than or equal to 30 psia, more preferably less than or equal to 16. Preferably the rod density and/or tap density of the dried gel compositions (Rod Density) is less than or equal to 115%, more preferably less than or equal to 110%, more preferably less than or equal to 105% of the theoretical density of the gel solids in the reaction solution (Theoretical Density) as shown below: (Rod or Tap Density/Theoretical Density)≦115%, preferably ≦110%, more preferably ≦105%. Rod density, tap density and theoretical density may be determined in the manners set forth below.

Preferred products of the present invention have a rod density of less than or equal to 0.27 g/cc, preferably less than or equal to 0.22 g/cc, more preferably less than or equal to 0.15 g/cc, and/or a tap density of less than or equal to 0.2 g/cc, preferably less than or equal to 0.15 g/cc, more preferably less than or equal to 0.10 g/cc.

In another aspect, the present invention provides a process for producing gel compositions comprising: drying a wet gel comprising gel solids and a drying agent to remove the drying agent under drying conditions sufficient to produce a dried gel composition have a rod density of less than or equal to 0.27 g/cc, preferably less than or equal to 0.22 g/cc, more preferably, less than or equal to 0.15 g/cc, at a pressure of less than or equal to 300 psia, preferably at a pressure of less than or equal to 100 psia, more preferably less than or equal to 30 psia, more preferably less than or equal to 16.

In a further aspect, the present invention provides a process for producing gel compositions comprising: drying a wet gel comprising gel solids and a drying agent to remove the drying agent under drying conditions sufficent to produce a dried gel composition have a tap density of less than or equal to 0.2 g/cc, preferably less than or equal to 0.15 g/cc, more preferably less than or equal to 0.10 g/cc at a pressure of less than or equal to 300 psia, preferably at a pressure of less than or equal to 100 psia, more preferably less than or equal to 30 psia, more preferably less than or equal to 16.

The processes of the present invention may be carried out utilizing conventional laboratory and industrial scale mixing vessels and equipment for handling gels and gel compositions. The choice of the particular equipment utilized to practice the processes of the present invention is believed to be within the skill of one of ordinary skill in the art and therefore is not described in detail below.

As will be recognized by one of ordinary skill in the art from the description and examples set forth herein, the processes of the present invention may be performed as continuous or batch processes.

The chemical properties of the drying agent of relevance to the process of the present invention include: ratio of liquid phase density to solid phase density at the freezing point ($\rho_{liquid}/\rho_{solid}$ ratio); vapor pressure at the freezing/melting point; heat of vaporization per volume; melting point; molecular weight; and water solubility. Suitable drying agents for use in the processes of the present invention have:

a $\rho_{liquid}/\rho_{solid}$ ratio at the freezing point of 0.95–1.05, preferably 0.97–1.03; and a vapor pressure at the freezing/melting point of greater than or equal to 1 Torr, preferably greater than or equal to 10 Torr, more preferably greater than or equal to 25 Torr. Preferably a drying agent for use in the process of the present invention additionally has one or more of the following properties:

a heat of vaporization per volume of less than 200 calories per cubic centimeter (cal/cc), preferably less than or equal to 125 cal/cc, more preferably less than or equal to 100 cal/cc ($\Delta H$ (cal/cc)≦200, preferably ≦125, more preferably ≦100);

a melting point within 15° C., preferably within 5° C., of the temperature at which the drying is being conducted;

a molecular weight of less than or equal to 300, preferably less than or equal to 100; and/or water solubility (i.e. water is soluble/miscible in the drying agent).

A further embodiment of a process of the present invention comprises drying a wet gel composition comprising gel solids and a drying agent to remove the drying agent wherein the drying agent has a $\rho_{liquid}/\rho_{solid}$ ratio at the freezing point of 0.95–1.05, preferably 0.97–1.03; and/or a vapor pressure at the freezing/melting point of greater than or equal to 1 Torr, preferably greater than or equal to 10 Torr, more preferably greater than or equal to 25 Torr. In preferred embodiments, the drying agent additionally has one or more of the following properties:

a heat of vaporization per volume of less than 200 calories per cubic centimeter (cal/cc), preferably less than or equal to 125 cal/cc, more preferably less than or equal to 100 cal/cc ($\Delta H$ (cal/cc)≦200, preferably ≦125, more preferably ≦100);

a melting point within 15° C., preferably within 5° C., of the temperature at which the drying is being conducted;

a molecular weight of less than or equal to 300, preferably less than or equal to 100; and/or water solubility (i.e. water is soluble/miscible in the drying agent).

The vapor pressure at the freezing/melting point of a drying agent relates to the rate at which the gel solids will dry. The sublimation (drying) rate is directly proportional to the vapor pressure at the solid-vapor interface. If the vapor pressure is to low, the drying rate is insufficient to maintain the interface temperature at or below the freezing rate. Preferred drying agents for use in processes of the present invention have vapor pressures at their freezing/melting point of greater than or equal to 1 Torr, preferably greater than or equal to 10 Torr, more preferably, greater than or equal to 25 Torr.

The total amount of energy which must be input into a "wet" gel to remove the liquid is directly proportional to the heat of vaporization per volume property of the drying agent. Although, in processes of the present invention the vapor may be sublimed, the net energy is from the liquid to vapor phase change even though the process pathway may be liquid to solid to vapor. Preferred drying agents for use in a process of the present invention have a heat of vaporization per volume property of less than or equal to 200 cal/cc, preferably less than or equal to 125 cal/cc, more preferably less than or equal to 100 cal/cc.

The melting point of a drying agent will affect the temperature conditions at which the drying step of a process of the present invention is conducted. Preferably, the temperature conditions during drying are within 15° C., more preferably within 5° C. of the freezing/melting point of the drying agent. In order to case processing, it is desirable that a process of the present invention be carried out near ambient temperature, therefore it is preferred that the freezing/melting point of the drying agent be within 15° C., more preferably within 5° C. of ambient temperature.

The molecular weight of a drying agent will generally affect the drying agent's freezing/melting point. When a drying agent is in the pores of a metal oxide and organo-metal oxide, the freezing point decreases as the molecular weight of the solvent increases in an exponential fashion. Therefore, preferred drying agents for use in a process of the present invention have molecular weights less than or equal to 300, preferably less than or equal to 100.

Examples of drying agents suitable for use in a process of the present invention are set forth in the following table. A preferred drying agent for use in a process of the present invention is t-butanol ($\rho_{liquid}/\rho_{solid}$ ratio at the freezing point of 1.00) due to its' high vapor pressure at the melting/freezing point in comparison to other drying agents.

| Drying Agent | V.P. at melting point (torr) | Melting Point (° C.) | ΔH (cal/ mol) | MW | ΔH (cal/ cm$^3$) | Solubility in Drying Agent (g H$_2$O/100 g) |
|---|---|---|---|---|---|---|
| t-butanol | 44 | 25.5 | 9330 | 74.1 | 99.3 | ∞ |
| CCl$_4$ | 8 | −23 | 7170 | 153.8 | 73.8 | ∞ |
| Formic Acid | 18 | 8 | 5240 | 46.0 | 139.6 | ∞ |
| 1,4 dioxane | 17 | 12 | 8690 | 88.1 | 101.9 | ∞ |
| t-butyl chloride | 25 | −25 | 6550 | 92.6 | 59.6 | very low |
| cyclohexane | 40 | 7 | 7160 | 84.1 | 66.3 | very low |
| p-xylene | 4 | 13 | 8500 | 122.2 | 59.9 | very low |
| acetic acid | 9 | 17 | 5660 | 60.1 | 98.8 | ∞ |

V.P. = vapor pressure; ΔH = Heat of Vaporization;
ΔH cal/cm$^3$ = heat of vaporization per volume; MW = molecular weight A conventional method for drying wet gels is to remove the liquid solvent by evaporation which results in the presence of a liquid-vapor interface. The driving force for evaporation is a lower vapor pressure of the solvent in the gas phase above the sample than the vapor pressure of the solvent at the liquid-vapor interface. This driving force may be obtained by increasing temperature or by lowering the gas phase vapor pressure by using a vacuum or a carrier gas. As a result of the liquid's surface tension, the interface is curved and exerts capillary pressure on the pore wall which can cause shrinkage of the material being dried. The magnitude of this capillary pressure that it exerts is inversely proportional to pore size. For the pore size of gels and fine powders (1–100 nm), this capillary pressure can exceed a thousand atmospheres. During solvent evaporation, the sample will continue to shrink until the strength of the material is sufficient to resist the capillary pressure. Due to this shrinkage, the dried gel composition will have a higher bulk density than the dried gel composition would have in the absence of shrinkage, making the gel composition less advantageous for certain applications.

Aerogels produced utilizing a supercritical drying step generally have lower rod densities and higher surface areas than heretofore known gel compositions produced without the use of supercritical drying and have therefore become the gel of choice for many applications. In supercritical drying, the temperature of the pore fluid is increased under pressure until the critical temperature and pressure are exceeded. In that case, no liquid-vapor interface occurs and hence shrinkage is avoided. However, the supercritical drying step necessary for the production of an aerogel may require the use of relatively expensive and/or complex processing equipment and conditions and therefore be disadvantageous.

Another possible approach to the production of gel compositions is to freeze dry the liquid solvent from the wet gel. In freeze drying, the liquid containing solid is first frozen. The pressure around the sample is than lowered to remove the frozen liquid by sublimation. For freeze drying, only solid-vapor interfaces exist and shrinkage is usually negligible. However, when drying either compliant materials, materials with small pore sizes, or fine powders, the use of freeze drying generally causes shrinkage and material deformation. The freezing point of a fluid in a pore is lower than the freezing point of the bulk liquid. Hence, as the sample is cooled, freezing occurs on the outside of the sample first. Liquid is drawn out of the pores to feed the continued freezing of the liquid and exerts a compressive force on the sample similar to solvent evaporation. Only when the sample is strong enough to resist this compressive force does shrinkage stop.

The processes of the present invention differ from the processes and drying methods discussed above. According to the present invention, the liquid in the gel sol prior to drying comprises a drying agent having the properties set forth herein. The "wet" gel is then dried under conditions, which in combination with the properties of the drying agent, minimize shrinkage of the gel composition solids to produce gel compositions. In the case where a wet gel composition comprises a solvent other than a drying agent, the liquid in the wet gel is replaced with a drying agent having the properties described above.

The drying of the gel may be accomplished utilizing a variety of process pathways. It is generally preferred in the processes of the present invention that drying be initiated at a temperature above the freezing point of the drying agent.

Preferably, the wet gel composition comprising gel solids and a drying agent is placed in a drier at a temperature approximately equal to or above the freezing point of the drying agent. Rapid drying may then be initiated by either establishing a vacuum or flowing a carrier gas by the sample. Preferably, the drying conditions are maintained such that the interface temperature of the vapor-liquid interface is rapidly cooled below the freezing point of the drying agent. This causes the formation of a frozen "crust" in the gel solids which means that there are liquid-solid and solid-vapor interfaces but minimal or no liquid-vapor interfaces. Drying is continued by continued vapor removal. The temperature of the drier can even be increased as long as the temperature at the interface is maintained below the freezing point of the liquid. The interface temperature (assuming that the solid is completely saturated) is related to the rate of energy transport to the sample and the mass transfer of vapor away from the sample. At equilibrium, the interface temperature is the so-called wet bulb temperature and is calculated from:

$$h(T_{drier} - T_{wet\ bulb}) = DJ\ kg(P_{drier} - P_{interface})$$
$$= DH\ kg(P_{drier} - F(T_{wet\ bulb}))$$

where:
h = heat transfer coefficient
$T_{drier}$ = drier temperature
$T_{wet\ bulb}$ = wet bulb temperature
DH = latent heat of vaporization
kg = mass transfer coefficient
$P_{drier}$ = partial pressure of solvent in drier
$P_{interface}$ = vapor pressure of solvent at interface temperature $T_{wet\ bulb}$ In a process of the present invention the wet bulb temperature at the interface will preferably be lower than the drier temperature (the temperature of the environment in which the wet gel is being dried). As the partial pressure driving force increases, the temperature difference between the drier and the wet bulb temperature increases. The combination of the drying rate and the heat of vaporization should be sufficient to lower the interfacial temperature to the freezing point. In the later stages of drying, the drier temperature can be increased since increased heat and mass transfer resistance inside the solid allows higher drier temperature with an interface temperature which is still at the freezing point.

The processes of the present invention may be utilized to produce gel compositions comprising: silica; titanium; aluminum; zirconium; other metal oxides and/or organo-metal oxides, or mixtures thereof. The gel compositions may further comprise filler materials including, but not limited to: carbonaceous materials; iron oxides; $Al_2O_3$; $FeTiO_3$; $TiO_2$; $ZrO_2$; and/or other filler materials known in the art. Carbonaceous materials include: carbon black; activated carbon; graphite; composites comprising carbon black and metal oxide (e.g. silica); and blends including such carbonaceous filler materials. A preferred carbon black has a nitrogen surface area ($N_2SA$) of at least 10 $m^2/g$, preferably 15 to 500 $m^2/g$.

A schematic diagram of an embodiment of a process of the present invention for producing a gel composition comprising silica is set forth in FIG. 1. As shown in FIG. 1, the process steps of the embodiments of the present invention may be performed after the initial gelation of a solution comprising a gel precursor.

Gel precursors include, but are not limited to, oxide, polymeric and particulate gel components known in the art, such as:

| Metal Oxide Gel Component | Form(s) as Gel Precursor |
| --- | --- |
| $SiO_2$ | Alkoxide, Silicate Compositions, Colloidal, Pyrogenic, Silicon Halides |
| $TiO_2$ | Alkoxide, Colloidal, Pryogenic, Titanate Compositions, Titanium Halides |
| $Al_2O_3$ | Alkoxides, Colloidal, Aluminate Compositions, Salts, Pyrogenic, Aluminum Halides Alkoxides, Colloidal, Zirconate Compositions, Salts, Pyrogenic, Zirconium Halides |
| Metal Oxide Composites | Combinations of the above precursors |
| Organo-Metal Oxide | Organo-metal forms of the above precursor |

Metal oxide composites refer to composite materials comprising combinations of metal and/or organo-metal oxides. The term organo-metal oxide refers to a composition comprising a metal oxide and an organic material (i.e. a material comprising $CH_x$ functionality) which may additionally comprise other chemical groups.

The choice of a particular gel precursor is made based on the type of composition desired. A preferred gel component for certain applications is $SiO_2$ with sodium silicate being the preferred precursor or form.

The initial gel may be produced from a stock solution. The stock solution may comprise the gel precursor, and a solvent. The amounts of each component will vary depending on the density and structure desired in the final gel composition. Suitable solvents will depend on the particular gel precursor. For a sodium silicate precursor a preferred solvent is water. The stock solution may be prepared by mixing the gel precursor and the solvent.

In order to achieve advantageously low densities in the final gel composition, the initial gelation step may be performed from a solution with a solids percentage by weight sufficiently low to achieve the rod density desired in the final gel composition after performing a process of the present invention, and by processing the solution, utilizing sol-gel processing techniques, in a manner wherein a low solids concentration is maintained in the final gel composition. In particular, the initial gelation step may be performed by initiating gelation in a solution comprising the gel precursor, or the gel precursor and additional solids, e.g. an opacifying agent, at an initial solids concentration to achieve the desired solids concentration in the final gel composition.

As understood by those of ordinary skill in the art, the solids concentration of the solution, which may comprise for example gel precursor and opacifying agent solids, is sufficient to achieve the densities desired in the final composition. In a preferred method of producing compositions of the present invention the solids concentration of the solution is less than or equal to 10%, preferably less than or equal to 8%, to achieve desirably low rod densities in the final composition.

The solution comprising the gel component may be produced, and the initial gelation may be performed, by conventional processes for producing gel compositions, for example utilizing conventional sol-gel processing techniques. In particular, the solution comprising the gel precursor may be produced and the initial gelation may be performed by the processes disclosed in the Examples herein. Various solutions, including metal alkoxides, colloidal suspensions, and combinations thereof may be utilized with a variety of mechanisms of gelation to reach the initial gelation stage. By varying processing conditions, such as time, temperature, pH, and pore fluid, the microstructure of the composition may be altered.

The initiation of gelation may be performed in any manner known in the art, including: manipulation of the pH of the stock solution through the addition of an acid or a base; manipulating the temperature and pressure of the stock solution through environmental controls; and utilizing a gelation catalyst, for example an acid or a base.

As shown in FIG. 1, after gelation through pH manipulation and the use of an gelation catalyst, e.g. sulfuric acid ($H_2SO_4$), the gel may be washed to remove residual salts. For example, in the case of a sodium silicate gel precursor and an $H_2SO_4$ catalyst, after gelation the gel may be washed with water to remove sodium sulfate ($Na_2SO_4$). The washing steps may be repeated until the desired amount of salts have been removed, for example to a point wherein the sodium concentration in the liquid phase is less than 100 parts per million.

After washing the resulting gel may be allowed to age in water to achieve the mechanical characteristics desired in the final gel composition.

As shown schematically in FIG. 1, after washing and/or aging, the solution remaining in the gel may be exchanged with a solution comprising a drying agent. The exchange step may be repeated several times if desired. Preferably, after the exchange step(s) has/have been completed, the starting solution in the gel (e.g. water) has been substantially completely replaced with the solution comprising the drying agent. In particular, it is preferred that the wet gel comprising the drying agent and the gel solids comprise less than 5%, by weight, preferably less than 2%, by weight, more preferably, less than 1%, by weight, water.

The drying agent solution comprises the drying agent and may further comprise a solvent. Suitable intermediate and solvents include, but are not limited to, methanol, ethanol, n-propanol, iso-propanol, n-pentane, n-hexane, n-heptane.

The drying agent solution may comprise greater than or equal to 90%, preferably greater than or equal to 98%, by weight, the drying agent with the remainder being a solvent or combination of solvents. In a preferred embodiment of the process of the present invention, the drying agent solution comprises 100% by weight the drying agent.

After the drying agent exchange, the resulting gel composition is dried. The drying step is performed in a manner sufficient to minimize shrinkage of the solids portion of the wet gel.

One suitable method for performing the drying step is to dry the gel composition under a vacuum, a pressure of from approximately 0 psi to the vapor pressure of the drying agent at the drying agent's freezing/melting point.

Another suitable method, which may be advantageous in a large scale production process, is to dry the gel utilizing a fluidized bed. In general, fluidized bed drying may be accomplished by placing the wet gel composition in a fluidized bed reactor and passing a dry inert (with respect to the gel composition) gas through the gel composition. The fluidization velocity, the gas stream velocity necessary to maintain fluidization, will depend on the physical characteristics and volume of the wet gel but should be sufficient to maintain fluidization. The temperature of the gas may be approximately ambient temperature, e.g. 16–25° C.

After drying, the gel composition may be further processed in manners known to the art. For example, the gel composition may be milled or ground to produce a powder comprising the gel composition, or the gel composition may be heated to above the boiling point of the drying agent to remove residual drying agent.

In addition to the steps discussed above, and/or shown schematically in FIG. 1, additional washing, drying and/or aging steps may be included in a process of the present invention where desirable to produce a particular gel composition. In particular, a process of the present invention may include one or more of the following steps:

washing the wet gel prior to drying agent exchange;

aging the wet gel after drying agent exchange and prior to drying;

exchanging (replacing) the fluid in the wet get with other solvents prior to exchanging the fluid with the drying agent solution. In addition, particular aging steps may be performed at elevated temperature and/or pressure.

In general, the washing or exchange steps will comprise exchanging the solution within the gel for another solution. In general, the aging steps will comprise maintaining the gel, with or without solution present within the gel, at particular temperature and pressure conditions.

Depending on the characteristics desired in the final gel composition, optional steps such as thermal (or hydrothermal) aging prior to drying may be included in the process of the present invention.

The processes of the present invention may also be advantageously utilized to produce gel compositions with a wide range of surface areas, e.g. 40–1000 m²/g, with the choice of particular surface area depending on the intended application for the gel composition. In particular, where desired, the process of the present invention may advantageously produce gel compositions having a BET surface areas of greater than or equal to 200 m²/g, preferably greater than or equal to 400 m²/g, more preferably greater than or equal to 500 m²/g. BET surface area may be determined utilizing ASTM test procedure D1993.

The processes of the present invention may further be advantageously utilized to produce gel compositions having a porosity of greater than or equal to 0.86, preferably greater than or equal to 0.91, more preferably greater than or equal to 0.93. Porosity may be determined in the manner set forth below.

In addition, the processes of the present invention may be utilized to produce gel compositions having a pore volume greater than or equal to 3 cc/g, preferably greater than or equal to 4.5 cc/g, more preferably greater than or equal to 8 cc/g. Pore volume is the inverse of Rod density and may be determined in the manner set forth below.

Further, the processes of the present invention may be utilized to produce hydrophilic gel compositions.

The gel compositions produced by the processes of the present invention may be utilized for applications including, but not limited to, thermal and acoustic insulation; catalyst supports and carriers; filters and molecular sieves; rheology control agents; reinforcing agents; thickeners and electronics; adsorbents; flatting agents; particulate additives; membranes; filters; radiation detectors; coatings; and dielectrics and other applications set forth herein and/or known to those of ordinary skill in the art.

The features and advantages of the processes of the present invention, and the gel compositions produced by the process of the present invention are further described in the following Examples.

The following analytical procedures may be utilized to determine properties of a gel composition and were utilized in the examples described below.

Porosity and Rod Density

The porosity of a gel compositions may be determined by determining the rod density of the composition and calculating the porosity by the following method.

To determine rod density, the gels were cast and formed in cylindrical molds. The total gel volume was determined by physically measuring the dimensions of a dry gel. The rod density was determined by weighing the dry gel and dividing by the geometric volume. In instances where a rod like geometry was not maintained or, as a verification of the above method, mercury displacement was employed.

The rod density of gel compositions measured by mercury displacement was carried out as follows. A clean empty glass cell is filled with mercury to a specific height and the cell is weighed. The mercury is then removed and the cell is cleaned again. Next, a dry gel sample of known weight is placed in the glass cell and mercury is added to the cell to the same specific height as before. The weight of the cell containing mercury and the sample is measured. The weight of mercury in both cases is then converted to a volume based on the density of mercury. The difference between the volume of mercury which fills an empty cell and the volume of mercury which fills the cell containing a sample is known as the displaced volume after subtracting the weight of the sample. Since mercury does not wet the sample this volume is equal to the total volume of the sample. The density is then determined by dividing the weight of the sample by the displaced volume.

Porosity is defined as the fraction of the sample volume that is pores, both in and around the particulate material and may be determined by the following formula:

$$Porosity = 1 - \frac{\text{(measured rod density in porous form)}}{\text{(density of the material in solid form)}}$$

(in the case of a silica gel→$\epsilon=1-\rho_{rod}/\rho_{SiO2}$) The density of a solid mass of the material is determined with reference to the composition of the material. In the case of a silica gel composition, without opacifying agents, the density of the solid mass of material is assumed to be the density of a solid mass of silica which is 2.2 g/cc (220 kg/m3). In the case of a gel composition which includes opacifying agents, the density of the solid mass of material is assumed to be a weighted average of the densities of each component. For example, in the case of a gel composition comprising a silica gel precursor and a carbon black opacifying agent, the density of the solid mass of material is assumed to be a weighted average of the density of a solid mass of silica (2.2 g/cc) and the density of a solid mass of carbon black (1.8 g/cc).

Pore Volume

The pore volume of a gel sample may be calculated from the rod density as determined by the foregoing procedure utilizing the following relationship for a silica gel:

rod density=1 /(pore volume+1/$\rho_{SiO2}$)

Tap Density

The tap density of the gel samples was determined by the following procedure. 1.0 g of the material being analyzed was placed in an oven at 140° C. for 4–6 hours to remove physically bound water. The dried material was lightly ground to yield fine powder. About 0.1–1.0 g of the powder was then weighed out and poured into a 10 cc graduated measuring cylinder. The cylinder was lightly tapped 200 times all around in order to efficiently pack the material. The volume occupied by the material was noted. The tap density was obtained by dividing the weight of the material by the occupied volume.

Determination of Theoretical Density

The theoretical density refers to the density of a dried sample that would be obtained if there is no shrinkage of the sample during drying. The theoretical density is calculated from the solids content (weight percentage of the sample) in solution, the solid phase density of the sample and the liquid phase density of the liquid in the solution. In the case of a wet gel, the theoretical density would be as shown below:

Theoretical Density=wt $\%_{solids}$/[wt $\%_{solids}/\rho_{solid}$+(100−wt $\%_{solids}/\rho_{drying\ agent}$)] wherein:

wt $\%_{solids}$=the percent by weight of the gel solids in the solution $\rho_{solid}$=the solid phase density of the gel $\rho_{drying\ agent}$=the liquid phase density of the drying agent.

Carbon Black Analyticals

The nitrogen surface area ($N_2SA$) of the carbon blacks utilized in the examples, expressed as square meters per gram ($m^2/g$) was determined according to ASTM test procedure D3037 Method A.

The dibutyl phthalate adsorption value (DBP) of the carbon blacks utilized in the examples, expressed as milliliters per 100 grams of carbon black (ml/100 g), was determined according to the procedure set forth in ASTM D2414.

Carbon Black Properties

Carbon black CB-A utilized in the following examples is a carbon black produced by Cabot Corporation, Boston, Mass. which has a $N_2SA$ of 24 $m^2/g$ and a DBP of 132 ml/100 g.

A Modified CB-A carbon black is produced utilizing the following procedure.

Two hundred grams of CB-A is added to a solution of 10.1 g sulfanilic acid and 6.23 g of concentrated nitric acid in 21 g of water. A solution of 4.87 g of $NaNO_2$ in 10 g of water is added to the rapidly stirring mixture. 4-Sulfobenzenediazonium hydroxide inner salt is formed in situ, which reacts with the carbon black. After 15 minutes, the dispersion is dried in an oven at 125 C.

The resulting carbon black product is designated "Modified CB-A" and is a carbon black having attached 4-C6H4SO3— groups.

BET Surface Area

BET surface area of a gel composition may be determined utilizing ASTM test procedure D1993.

Sodium Analysis

The analysis of the sodium content of the wet gels described in the examples below was performed utilizing a Model 710A sodium ion specific electrode, manufactured by Orion Research of Boston, Mass.

Residual Water Content

The residual water content of the wet gels was determined by gas chromatography utilizing a Hewlett Packard Model 5890 Gas Chromatography, manufactured by Hewlett Packard, Inc., Palo Alto, Calif.

The features and advantages of the process of the present invention are further illustrated by the following examples.

EXAMPLES 1–26

Examples 1–26 illustrate processes for producing gel compositions including processes of the present invention and comparative processes. The examples which illustrate a process of the present invention are identified as "Example #", the comparative examples, which illustrate other processes are identified as "Comparative Example #".

Except where indicated, the processes were performed at ambient temperatures, approximately 20° C., and ambient pressures, approximately 12.2 psia in Albuquerque, N.Mex.

The drying agents were utilized in each process were selected from the following group and had the properties set forth below:

| Drying Agent | V.P. at melting int (torr) | Melting Point (° C.) | ΔH (cal/mol) | MW | ΔH (cal/cm³) | Solubility in Drying Agent (g H₂O/100 g) |
|---|---|---|---|---|---|---|
| ethanol | <0.00001 | −115 | 9260 | 46 | 158.8 | ∞ |
| isopropanol | <0.001 | −90 | 9520 | 60.1 | 125.0 | ∞ |
| t-butanol | 44 | 25.5 | 9330 | 74.1 | 99.3 | ∞ |
| acetone | <0.02 | −95 | 6960 | 58.1 | 94.6 | ∞ |
| water | <5 | 0 | 9717 | 18 | 539 | ∞ |

V.P. = vapor pressure; ΔH = Heat of Vaporization;
ΔH cal/cm³ = heat of vaporization per volume; MW = molecular weight Three different techniques were utilized to dry the wet gels. The first drying technique utilized was vacuum drying wherein the wet gels were placed in a vacuum chamber at 25° C. and dried while pulling a vacuum down to approximately 10 Torr.

The second drying technique utilized was oven drying wherein the wet gels were placed in an oven maintained at a temperature of 140° C.

The third drying technique utilized was fluidized bed drying. The wet gels were ground to an average size of approximately 250 microns and placed in a 10 centimeter in diameter fluidized bed dryer. Dry nitrogen gas, having a initial temperature of 16–20° C. was blown through the wet gel granules at a drying flow rate of 400 cu.ft/hour. As the gels dried, the gel particles were collected and analyzed by the techniques described herein.

Example 1

This example illustrates a process of the present invention for producing a gel composition comprising silica and carbon black. The carbon black utilized was Modified CB-A having the properties described above.

A silica stock solution was prepared by mixing commercially available sodium silicate (PQ Corporation $SiO_2$/NaO molar ratio of 3.3:1) with deionized water in a volume ratio of water to sodium silicate such that the weight percent silica such that the weight percent silica when neutralized with mineral acid was 5%. A separate solution consisting of 2M $H_2SO_4$ was prepared by diluting concentrated sulfuric acid (J. T. Baker 98%) with water. An aliquot of the sodium silicate stock solution was then slowly added to an appropriate amount of stirred 2M acid such that the resulting silica sol would have a pH of approximately 1.3 to 2.0. At this point, carbon black CB-A was added to the sol such that the overall solids content (silica+carbon) was maintained at 5% and the carbon content as a percentage of the total solids was 15%. The rate of silicate addition was kept constant at 1 ml/minute and the acid solution was maintained at 15° C. in a jacketed beaker.

Gelation was accomplished by continued addition of the sodium silicate solution until the pH of the sol reached 5.0. At this point the sol was vigorously stirred for 2–5 minutes and then cast into cylindrical tubes. Gelation occurred in 5 to 15 minutes and the tubes were sealed to prevent drying. The gels were allowed to age for 1–2 hours at 50° C. in the molds after which they were removed and placed in sealed tubes containing deionized water and kept at room temperature. Fresh water was added every 5 hours for a total of 20 hours at which time it was determined through the use of the sodium electrode (described above) that the sodium sulfate salt was sufficiently removed from the gel. The gels were then aged at 80° C. in deionized water for 1 hour.

Upon removal from the oven the gels were rinsed several times with deionized water and placed in sealed tubes with tert-butanol and allowed to exchange pore fluid for 6 hours at 50° C. This was repeated until the residual water content of the gel reached approximately 0.5% by volume.

The gels were then placed in a chamber and vacuum dried. The resulting materials had a bulk density of 0.10 g/cm³.

These results illustrate that the process of the present invention may be utilized to produce gel compositions with bulk densities below 0.27 g/cm³.

Comparative Example 2

The steps from example 1 were essentially repeated with a minor exception. The water was washed free from the gel with tert-butanol until the residual water content of the gel reached approximately 5% by volume. The gels were then placed in a chamber and vacuum dried. The resulting materials had a bulk density of 0.35 g/cm³.

These results illustrate that increased water content in the wet gel will reduce the effectiveness of the process of the present invention in producing gel compositions with bulk densities below 0.27 g/cm³.

Comparative Example 3

The steps from example 1 were essentially repeated with a minor exception. Ethanol was used instead of tert-butanol to wash the water free from the gel. This was repeated until the residual water content of the gel reached approximately 0.5% by volume. The gels were then placed in a chamber and vacuum dried. The resulting materials had a bulk density of 0.34 g/cm³.

These results illustrate that the higher bulk density gel compositions were achieved when using a drying agent with properties outside the preferred ranges.

Comparative Example 4

The steps from example 1 were essentially repeated with a minor exception. Acetone was used instead of tert-butanol to wash the water free from the gel. This was repeated until the residual water content of the gel reached approximately 0.5% by volume. The gels were then placed in a chamber and vacuum dried. The resulting materials had a bulk density of 0.35 g/cm³.

These results illustrate that the higher bulk density gel compositions were achieved when using a drying agent with properties outside the preferred ranges.

Comparative Example 5

The steps from example 1 were essentially repeated with a minor exception. Isopropyl alcohol was used instead of tert-butanol to wash the water free from the gel. This was repeated until the residual water content of the gel reached approximately 0.5% by volume. The gels were then placed in a chamber and vacuum dried. The resulting materials had a bulk density of 0.32 g/cm³.

These results illustrate that the higher bulk density gel compositions were achieved when using a drying agent with properties outside the preferred ranges.

Comparative Example 6

The steps from example 1 were essentially repeated with a minor exception. After the exchanges into tert-butanol, the gels were then placed in a conventional oven at 140° C. to dry. The resulting materials had a bulk density of 0.33 g/cm³.

These results indicate that oven drying with the tert-butanol drying agent produced gel compositions with higher bulk densities than vacuum drying.

Comparative Example 7

The steps from example 6 were essentially repeated with a minor exception. Ethanol was used instead of tert-butanol to wash the water free from the gel. This was repeated until the residual water content of the gel reached approximately 0.5% by volume, after which the gels were placed in a conventional oven at 140° C. to dry. The resulting materials had a bulk density of 0.31 g/cm³.

These results indicate that oven drying with the ethanol drying agent produced gel compositions with lower bulk densities than vacuum drying.

Comparative Example 8

The steps from example 6 were essentially repeated with a minor exception. Acetone was used instead of tert-butanol to wash the water free from the gel. This was repeated until the residual water content of the gel reached approximately 0.5% by volume, after which the gels were placed in a conventional oven at 140° C. to dry. The resulting materials had a bulk density of 0.29 g/cm$^3$.

These results indicate that oven drying with the acetone drying agent produced gel compositions with lower bulk densities than vacuum drying.

Comparative Example 9

The steps from example 6 were essentially repeated with a minor exception. Isopropyl alcohol was used instead of tert-butanol to wash the water free from the gel. This was repeated until the residual water content of the gel reached approximately 0.5% by volume, after which the gels were placed in a conventional oven at 140° C. to dry. The resulting materials had a bulk density of 0.30 g/cm$^3$.

These results indicate that oven drying with the isopropyl alcohol drying agent produced gel compositions with lower bulk densities than vacuum drying.

Example 10

The steps from example 1 were essentially duplicated with a few minor exceptions. In this example the appropriate amounts of sodium silicate and sulfuric acid were combined to where the solids content was maintained at 5%, however, no carbon black was added to this sample. After replacement of water with tert-butanol the gels were then placed in a chamber and vacuum dried. The resulting materials had a bulk density of 0.09 g/cm$^3$.

These results indicate that a process of the present invention may be utilized to produce a gel composition with a low bulk density.

Example 11

The steps from example 1 were essentially duplicated with a few minor exceptions. In this example the appropriate amounts of sodium silicate and sulfuric acid were combined to where the solids content was adjusted to 8%. No carbon black was added to this sample. After replacement of water with tert-butanol the gels were then placed in a chamber and vacuum dried. The resulting materials had a bulk density of 0.11 g/cm$^3$.

These results indicate that a process of the present invention may be utilized to produce a gel composition with a low bulk density.

Example 12

The steps from example 1 were essentially duplicated with a few minor exceptions. In this example the appropriate amounts of sodium silicate and sulfuric acid were combined to where the solids content was adjusted to 10%. No carbon black was added to this sample. After replacement of water with tert-butanol the gels were then placed in a chamber and vacuum dried. The resulting materials had a bulk density of 0.13 g/cm$^3$.

These results indicate that a process of the present invention may be utilized to produce a gel composition with a low bulk density.

Example 13

The steps from example 1 were essentially duplicated with a few minor exceptions. In this example the appropriate amounts of sodium silicate and sulfuric acid were combined to where the solids content was adjusted to 12%. No carbon black was added to this sample. After replacement of water with tert-butanol the gels were then placed in a chamber and vacuum dried. The resulting materials had a bulk density of 0.15 g/cm$^3$.

These results indicate that a process of the present invention may be utilized to produce a gel composition with a low bulk density.

Example 14

The steps from example 1 were essentially duplicated with a few minor exceptions. After replacement of water with tert-butanol the gels were then placed in a fluidized bed chamber and dried by passing dry nitrogen through the wet material. The temperature of the incoming nitrogen is maintained between 16 and 25° C. The nitrogen flowrate used was 100 SCFH for 50 g of initial wet material. After removal from the chamber the sample is placed in a convection oven at 140° C. for 1–2 hours. The resulting materials had a tap density of 0.065 g/cm$^3$.

These results indicate that a process of the present invention may be advantageously utilized in conjunction with fluidized bed drying to produce a gel compositions with a low densities.

Example 15

The steps from example 14 were essentially duplicated with a minor exception. The temperature of the incoming nitrogen is fixed at 30° C. The nitrogen flowrate used was 100 SCFH for 50 g of initial wet material. After removal from the chamber the sample is placed in a convection oven at 140° C. for 1–2 hours. The resulting materials had a tap density of 0.05 g/cm$^3$.

These results indicate that a process of the present invention may be advantageously utilized in conjunction with fluidized bed drying to produce a gel compositions with a low densities.

Example 16

The steps from example 14 were essentially duplicated with a minor exception. The temperature of the incoming nitrogen is fixed at 40° C. The nitrogen flowrate used was 100 SCFH for 50 g of initial wet material. After removal from the chamber the sample is placed in a convection oven at 140° C. for 1–2 hours. The resulting materials had a tap density of 0.085 g/cm$^3$.

These results indicate that a process of the present invention may be advantageously utilized in conjunction with fluidized bed drying to produce a gel compositions with a low densities.

Example 17

The steps from example 14 were essentially duplicated with a minor exception. The temperature of the incoming nitrogen is fixed at 50° C. The nitrogen flowrate used was 100 SCFH for 50 g of initial wet material. After removal from the chamber the sample is placed in a convection oven at 140° C. for 1–2 hours. The resulting materials had a tap density of 0.09 g/cm$^3$.

These results indicate that a process of the present invention may be advantageously utilized in conjunction with fluidized bed drying to produce a gel compositions with a low densities.

Example 18

The steps from example 14 were essentially duplicated with a minor exception. The temperature of the incoming nitrogen is fixed at 60° C. The nitrogen flowrate used was 100 SCFH for 50 g of initial wet material. After removal from the chamber the sample is placed in a convection oven at 140° C. for 1–2 hours. The resulting materials had a tap density of 0.10 g /m³.

These results indicate that a process of the present invention may be advantageously utilized in conjunction with fluidized bed drying to produce a gel compositions with a low densities.

Example 19

The steps from example 14 were essentially duplicated with a minor exception. The temperature of the incoming nitrogen is fixed at 20° C. for 3–5 minutes and is subsequently raised 2–3° C./min. The nitrogen flowrate used was 100 SCFH for 50 g of initial wet material. After removal from the chamber the sample is placed in a convection oven at 140° C. for 1–2 hours. The resulting materials had a tap density of 0.05 g/cm³.

These results indicate that a process of the present invention may be advantageously utilized in conjunction with fluidized bed drying to produce a gel compositions with a low densities.

Comparative Example 20

The steps from example 10 were essentially duplicated with a minor exception. Ethanol was used instead of tert-butanol to wash the water free from the gel. This was repeated until the residual water content of the gel reached approximately 0.5% by volume, after which they were placed in a fluidized bed chamber and dried by passing dry nitrogen through the wet material. The resulting materials had a tap density of 0.252 g/cc.

These results illustrate that the higher tap density gel compositions were achieved when using a drying agent with properties outside the preferred ranges.

Comparative Example 21

The steps from example 10 were essentially duplicated with a minor exception. Acetone was used instead of tert-butanol to wash the water free from the gel. This was repeated until the residual water content of the gel reached approximately 0.5% by volume, after which they were placed in a fluidized bed chamber and dried by passing dry nitrogen through the wet material. The resulting materials had a tap density of 0.324 g/cc.

These results illustrate that the higher tap density gel compositions were achieved when using a drying agent with properties outside the preferred ranges.

Comparative Example 22

The steps from example 10 were essentially duplicated to form a wet gel comprising gel solids and water. The wet gel was then dried directly by placing the wet gel in a fluidized bed chamber and dried by passing dry nitrogen through the wet material. The resulting materials had a tap density of 0.663 g/cc.

These results illustrate that the higher bulk density gel compositions were achieved when using a drying agent with properties outside the preferred ranges.

Example 23

The steps from example 10 were essentially duplicated with a few minor exceptions. In this example the appropriate amounts of sodium silicate and sulfuric acid were combined and the solids content was maintained at 5%. In addition, the synthesis of this material was adjusted such that 22 liters of sol was formed which eventually turned into a gel. This material was then reduced in size for reasonable washing and solvent exchange times. After the water was replaced with tert-butanol, a portion of the gels are placed in a fluidized bed chamber and dried by passing dry nitrogen through the wet material. The resulting materials had a tap density of 0.07 g/cm³ and a surface area of 826 m²/g.

These results indicate that a process of the present invention may be advantageously utilized in conjunction with fluidized bed drying to produce a gel compositions with a low densities and high surface areas.

Example 24

The steps from example 10 were essentially duplicated with a few minor exceptions. In this example the appropriate amounts of sodium silicate and sulfuric acid were combined such that the resulting solids content was 8% on a silica basis. No carbon black was included in this composition and the gels were aged for 18 hours at 60° C. All other steps were kept the same as example 14. The resulting materials had a tap density of 0.09 g/cm³ and a surface area of 655 m²/g.

These results indicate that a process of the present invention may be advantageously utilized in conjunction with fluidized bed drying to produce a gel compositions with a low densities and high surface areas.

Example 25

The steps from example 10 were essentially duplicated with a few minor exceptions. In this example the appropriate amounts of sodium silicate and sulfuric acid were combined such that the resulting solids content was 10% on a silica basis. No carbon black was included in this composition and the gels were aged for 18 hours at 60° C. All other steps were kept the same as example 14. The resulting materials had a tap density of 0.12 g/cm³ and a surface area of 655 m²/g.

These results indicate that a process of the present invention may be advantageously utilized in conjunction with fluidized bed drying to produce a gel compositions with a low densities and high surface areas.

Example 26

The steps from example 10 were essentially duplicated with a few minor exceptions. In this example the appropriate amounts of sodium was 12% on a silica basis. No carbon black was included in this composition and the gels were aged for 18 hours at 60° C. All other steps were kept the same as example 14. The resulting materials had a tap density of 0.15 g/cm³ and a surface area of 765 m²/g.

These results indicate that a process of the present invention may be advantageously utilized in conjunction with fluidized bed drying to produce a gel compositions with a low densities and high surface areas.

Example 27

The steps from example 10 were essentially duplicated with a few minor exceptions. In this example the appropriate amounts of sodium silicate and sulfuric acid were combined and the solids content was maintained at 5%. In addition, the synthesis of this material was adjusted such that 22 liters of sol was formed which eventually turned into a gel. This material was then reduced in size for reasonable washing and solvent exchange times. After the water was replaced with tert-butanol, the gel was placed in a freezer at −14° C. for 1 to 2 days to freeze the gel. A portion of the frozen gel granules were placed in a fluidized bed chamber and dried by passing dry nitrogen through the wet material.

The resulting materials had a tap density of 0. 147 g/cm³.

These results indicate that a process of the present invention may be advantageously utilized in conjunction with freeze drying.

The results from each of the foregoing examples are summarized in the following Table 1:

TABLE 1

| Ex. | Comp. Ex. | Gel Composition % = %, by weight | Drying Agent | Drying Technique | Bulk Density g/cc | Tap Density g/cc |
|---|---|---|---|---|---|---|
| 1  | —  | 5% (SiO$_2$ + CB) | tert-butanol    | vacuum        | 0.10 | NM    |
| —  | 2  | 5% (SiO$_2$ + CB) | tert-butanol*   | vacuum        | 0.35 | NM    |
| —  | 3  | 5% (SiO$_2$ + CB) | ethanol         | vacuum        | 0.34 | NM    |
| —  | 4  | 5% (SiO$_2$ + CB) | acetone         | vacuum        | 0.35 | NM    |
| —  | 5  | 5% (SiO$_2$ + CB) | iso-propanol    | vacuum        | 0.32 | NM    |
| —  | 6  | 5% (SiO$_2$ + CB) | tert-butanol    | oven          | 0.33 | NM    |
| —  | 7  | 5% (SiO$_2$ + CB) | ethanol         | oven          | 0.31 | NM    |
| —  | 8  | 5% (SiO$_2$ + CB) | acetone         | oven          | 0.29 | NM    |
| —  | 9  | 5% (SiO$_2$ + CB) | iso-propanol    | oven          | 0.30 | NM    |
| 10 | —  | 5% SiO$_2$        | tert-butanol    | vacuum        | 0.09 | NM    |
| 11 | —  | 8% SiO$_2$        | tert-butanol    | vacuum        | 0.11 | NM    |
| 12 | —  | 10% SiO$_2$       | tert-butanol    | vacuum        | 0.13 | NM    |
| 13 | —  | 12% SiO$_2$       | tert-butanol    | vacuum        | 0.15 | NM    |
| 14 | —  | 5% (SiO$_2$ + CB) | tert-butanol    | fluidized bed | NM   | 0.065 |
| 15 | —  | 5% (SiO$_2$ + CB) | tert-butanol    | fluidized bed | NM   | 0.05  |
| 16 | —  | 5% (SiO$_2$ + CB) | tert-butanol    | fluidized bed | NM   | 0.085 |
| 17 | —  | 5% (SiO$_2$ + CB) | tert-butanol    | fluidized bed | NM   | 0.09  |
| 18 | —  | 5% (SiO$_2$ + CB) | tert-butanol    | fluidized bed | NM   | 0.10  |
| 19 | —  | 5% (SiO$_2$ + CB) | tert-butanol    | fluidized bed | NM   | 0.05  |
| —  | 20 | 5% SiO$_2$        | ethanol         | fluidized bed | NM   | 0.252 |
| —  | 21 | 5% SiO$_2$        | acetone         | fluidized bed | NM   | 0.324 |
| —  | 22 | 5% SiO$_2$        | water           | fluidized bed | NM   | 0.663 |
| 23 | —  | 5% SiO$_2$        | tert-butanol    | fluidized bed | NM   | 0.07  |
| 24 | —  | 8% SiO$_2$        | tert-butanol    | fluidized bed | NM   | 0.09  |
| 25 | —  | 10% SiO$_2$       | tert-butanol    | fluidized bed | NM   | 0.12  |
| 26 | —  | 12% SiO$_2$       | tert-butanol    | fluidized bed | NM   | 0.15  |
| 27 | —  | 5% SiO$_2$        | tert-butanol**  | fluidized bed | NM   | 0.147 |

*—Water content of 5%, by weight, **—frozen
Ex. = Example, Comp. Ex. = Comparative Example, NM = not measured
CB = Carbon Black, 15% by weight These results are discussed in the description of each example.

It should be clearly understood that the forms of the present invention herein described are illustrative only and are not intended to limit the scope of the invention.

What is claimed is:

1. A process for producing a gel composition comprising drying a wet gel comprising gel solids and a drying agent having a vapor pressure at its freezing/melting point greater than or equal to 1 Torr to remove the drying agent under drying conditions sufficient to produce a dried gel composition having a rod density of less than or equal to 0.27 g/cc and at a pressure of less than or equal to 300 psia and at a temperature within 15 degrees Celsius of the freezing/melting point of the drying agent.

2. The process of claim 1 wherein the rod density of the dried gel composition is less than or equal to 115% of the theoretical density of the gel solids in the wet gel.

3. The process of claim 1 wherein the drying conditions are sufficient to produce a dried gel composition having a tap density of less than 0.2 g/cc.

4. The process of claim 1 wherein the $\rho_{liquid}/\rho_{solid}$ ratio of the drying agent at its freezing/melting point is 0.95 to 1.05.

5. The process of claim 4 wherein the rod density of the dried gel composition is less than or equal to 115% of the theoretical density of the gel solids in the wet gel.

6. The process of claim 4 wherein the drying conditions are sufficient to produce a dried gel composition having a tap density of less than 0.2 g/cc.

7. The process of claim 4 wherein the dried gel composition is hydrophobic.

8. The process of claim 4 wherein the drying agent is t-butanol.

9. The process of claim 7 wherein the gel composition comprises silica.

10. The process of claim 9 wherein the gel composition further comprises carbon black.

11. The process of claim 1 wherein the gel composition comprises silica.

12. The process of claim 1 wherein the gel composition further comprises carbon black.

13. The process of claim 1 wherein the dried gel composition is hydrophobic.

14. The process of claim 1 wherein the drying agent is t-butanol.

* * * * *